(12) United States Patent
Sau et al.

(10) Patent No.: US 7,542,067 B2
(45) Date of Patent: Jun. 2, 2009

(54) SYSTEM OF USING DIGITAL FRAMES IN AN IDLE WEB VIDEO CONFERENCING DEVICE

(75) Inventors: Keson Sau, Sindian (TW); James Yen, Taipei (TW)

(73) Assignee: Lite-On Technology Corporation, Taipei (TW)

( * ) Notice: Subject to any disclaimer, the term of this patent is extended or adjusted under 35 U.S.C. 154(b) by 762 days.

(21) Appl. No.: 11/168,550

(22) Filed: Jun. 29, 2005

(65) Prior Publication Data
US 2006/0139444 A1    Jun. 29, 2006

(30) Foreign Application Priority Data
Dec. 29, 2004   (TW) .............................. 93141243 A

(51) Int. Cl.
*H04N 7/14* (2006.01)
(52) U.S. Cl. .................. 348/14.07; 348/14.01
(58) Field of Classification Search ............. 348/14.07, 348/14.11, 14.13, 14.14, 14.01
See application file for complete search history.

(56) References Cited

U.S. PATENT DOCUMENTS

| | | | | |
|---|---|---|---|---|
| 5,512,938 A * | 4/1996 | Ohno | ......................... | 348/14.1 |
| 2002/0180863 A1* | 12/2002 | Fukuda | ..................... | 348/14.01 |
| 2004/0041902 A1* | 3/2004 | Washington | .............. | 348/14.01 |
| 2004/0117847 A1* | 6/2004 | Karaoguz et al. | ........... | 725/134 |
| 2005/0073574 A1* | 4/2005 | Krisbergh et al. | ......... | 348/14.01 |

* cited by examiner

*Primary Examiner*—Stella L Woo
(74) *Attorney, Agent, or Firm*—Rabin & Berdo, P.C.

(57) ABSTRACT

A system switches the display screen of an idle web video conferencing device to a digital frame. If there is no video conferencing signal coming into a VoIP phone, its display interface is used as a digital frame. The system includes a display to display the video conferencing image sent by another party over the Internet and outputting a digital frame image when it is idle; a medium processing device including an audio/video (AV) decoder for processing the video conferencing AV signals and an image decoder for processing digital pictures; a switch control device for switching between the AV decoder and the image decoder, achieving the goal of converting between the video conferencing AV and the digital frame image.

11 Claims, 2 Drawing Sheets

SYSTEM OF USING DIGITAL FRAMES IN AN IDLE WEB VIDEO CONFERENCING DEVICE

This Non-provisional application claims priority under 35 U.S.C. § 119(a) on Patent Application No(s). 093141243 filed in Taiwan on Dec. 29, 2004, the entire contents of which are hereby incorporated by reference.

BACKGROUND OF THE INVENTION

1. Field of Invention

The invention relates to a system that switches between a display screen and a digital frame. When it is used in an idle web video conferencing system, the display can function as a digital frame.

2. Related Art

In recent years, products endowed with the digital and web concepts are making great progress and bringing new power to conventional merchandises. In particular, two digital products have brought us tremendous convenience; namely, the digital cameras and VoIP phone.

Generally speaking, the telephone is a basic device at home or in offices. As the web environment enters the broadband era, various web applications have become mature. The VoIP phone is a product under this atmosphere. The VoIP phone has already entered a new developing time due to its mature technology and the relaxation of all kinds of human restrictions. The increase in the personal bandwidth use and the drop in the connection fees also help a lot.

The invention of the digital camera is also a revolution to our life. Using normal cameras, one has to spend a lot of money on purchasing films and photo development. The digital camera brings in the convenience of freeing oneself from films, waiting, and developing. Therefore, it is expected that digital cameras will dominate over conventional cameras. However, they have the disadvantage that the digital photos have to be viewed on a display of a computer operating system, in contrast to the conventional physical photos. As a result, a digital frame technique is developed in recent years to utilize the digital image processing technology to directly present digital images captured by the digital cameras over the display of the digital frame. Obviously the colors do not fade away. It is also convenient for the user to change pictures with his or her mood. It is free from searching for a photo in the conventional album. In offices or at home, the digital frame has its display screen. The VoIP phone also has a display device. However, its display screen is used only when a web video conferencing image is sent in. The display is idle for most of the time. Thus, the functions and efficiency of the display are not fully utilized. Moreover, the digital frame has some overlap with the VoIP phone in the basic algorithm of their media decoders. It is therefore very costly if one has both VoIP phone and digital frame operating independently. Accordingly, it is highly desirable to provide a system that can efficiently integrate and arrange the VoIP phone and the digital frame.

SUMMARY OF THE INVENTION

In view of the foregoing problems, the invention provides a system that can switch the display screen to the digital frame when the web video conferencing device is idle. When there is no web video conferencing signal coming into this system, the display of the web video conferencing device functions as a digital frame. It is not switched back to the web video conferencing screen until a web video conferencing signal is received. In other words, the invention integrates the functions of the VoIP phone and the digital frame.

The disclosed system includes: a display, which can be a liquid crystal display (LCD), an organic light-emitting diode (LED) display, and a field emission display, to display web video conferencing images and to show digital photo images when it is idle; a medium processing device having an audio/video (AV) decoder and an image decoder, the medium processing device being coupled to the display for the AV decoder to decode the input video conferencing signal into video images and for the image decoder to decode the input compressed image into photo images that are shown on the display when it is idle; and a switch control device, which is coupled to the AV decoder and the image decoder, wherein when the video conferencing packet input terminates the switch control device sends out an interrupt signal to the AV decoder to stop its operation and a start signal to the image decoder for it to start outputting photo images to the display. The invention thus achieves the goal of switching to the digital frame function when the web video conferencing device is idle.

BRIEF DESCRIPTION OF THE DRAWINGS

The invention will become more fully understood from the detailed description given hereinbelow illustration only, and thus are not limitative of the present invention, and wherein.

DETAILED DESCRIPTION OF THE INVENTION

Figure 1:
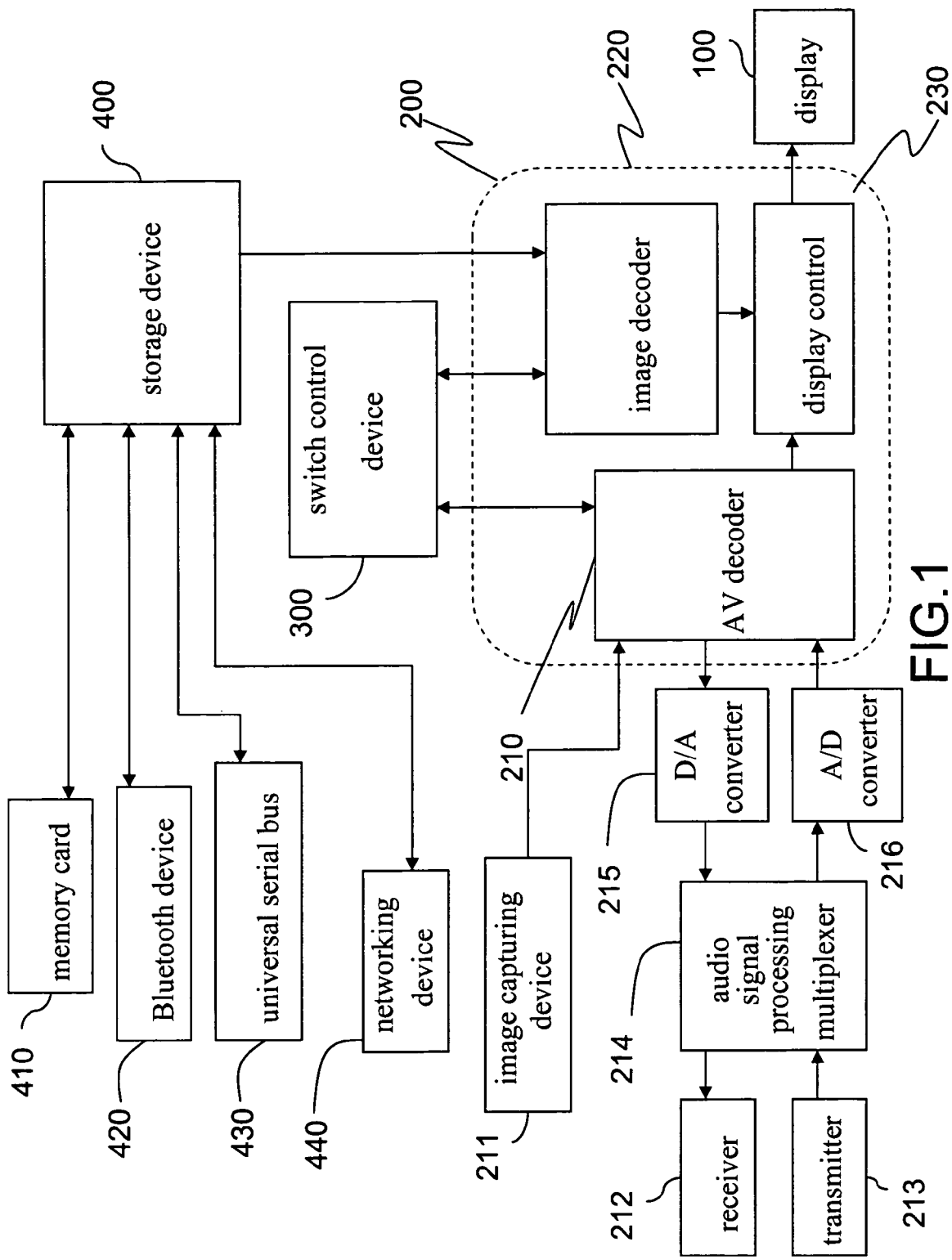
FIG. 1 is a block diagram of the disclosed system.

The web video conferencing device referred herein satisfies the VoIP communication system protocol and contains H.323, the media gateway control protocol (MGCP) and the session initiation protocol (SIP) standards. With reference to FIG. 1, a block diagram of the invention, the disclosed system contains a display 100, a medium processing device 200, and a switch control device 300. The medium processing device 200 further contains an AV decoder 210, an image decoder 220, and a display control 230.

The display 100 is an LCD. It is usually an independent device coupled to a web video conferencing device through a display interface. When a web video conferencing signal is received, the display shows the image according to its video conferencing function. When it is idle, a digital photo can be shown according to the required size and resolution on the display 100.

The medium processing device 200 includes an AV decoder 210 and an image decoder 220. The AV decoder 210 processes the audio and video signals transmitted over a network. The image is obtained from an image capturing device 211, such as a complementary metal-oxide semiconductor (CMOS) charge-coupled device (CCD). When an image signal enters the AV decoder 210, it is transmitted to a receiving terminal via the network after encoding according to the H.261 and H.263 video conferencing standards. The audio signal is normally transmitted via the hand-held phone set, which has a receiver 212 and a transmitter 213. The transmitter 213 receives the audio signal and converts it from an analog signal to a digital signal using an analog/digital (A/D) converter 216 in an audio signal processing multiplexer 214. The audio signal is sent to the AV encoder 210. The audio is then transmitted via the network to the other party after encoding according to the G.726 and G.723.1 audio encoding standards. The received audio signal is converted by a digital/analog (D/A) converter 215 into an analog signal. After passing through an audio signal processing multiplexer 214, the audio signal is transmitted to the receiver 212.

The image decoder 220 satisfies the joint photographic experts group (JPEG) standard. It decompresses compressed image data into a digital image signal. The display 100 then displays the decompressed image to show a digital photo. However, for either the AV decoder 210 or the image decoder 220, the signal goes through a display control 230 to make the resolution and fidelity adjustment before reaching the display 100. Generally speaking, to render smooth video images, the image resolution output from the AV decoder 210 does not need to be as fine as the image decoder 220. The image decoder 220 displays digital photos. The resolution, more specifically, the spatial resolution, is determined by the number of pixels in the digital camera that captures the image. Normally, the digital photos require a high spatial resolution than the web video conferencing images and are generally finer.

The switch control device 300 is coupled to and controls the AV encoder 210 and the image decoder 220. When a web video conferencing signal packet enters from the transmitter of the other party, the AV decoder 210 decodes and outputs it to the display 100. In this case, the image decoder 220 is off. Both parties can use the screen to do video conferencing. The audio signal is transmitted and/received via a moth piece or speaker and a microphone. One may also use a wireless phone set or some external device. When the conversation is over, the web video conferencing signal packet stops entering the AV decoder 210. In this case, the switch control device 300 sends out an interrupt signal to the AV decoder 210 to stop its operation and a start signal to the image decoder 220 for it to output photo images to the display 100. In this embodiment, whether any web video conferencing signal packet enters the AV decoder 210 is used as the criterion of the switch control device 300 for switching. Therefore, only when an audio signal is transmitted into the AV decoder 210, the switch control device 300 does not act. The display still shows the digital photo image output by the image decoder 220.

The storage of digital photos requires a storage device 400, which can be an extended memory module for holding tens to hundreds o digital images. Besides, the device can have an additional hard disk drive (HDD) according to needs to store a larger amount of digital image data. The input and access of image data can be achieved in various ways. Such devices are all internal ones or external via built-in interfaces. In the disclosed web video conferencing device, there are a memory card 410, a Bluetooth device 420, a universal serial bus (USB) 430, and a networking device 440. Through these transmission interfaces, the digital photos in a digital camera or image files on another storage device can be transmitted into the storage device 400 of the disclosed web video conferencing device. However, such examples should not be used to restrict the invention. Any other storage means are also within the spirit and scope of the invention.

Figure 2:
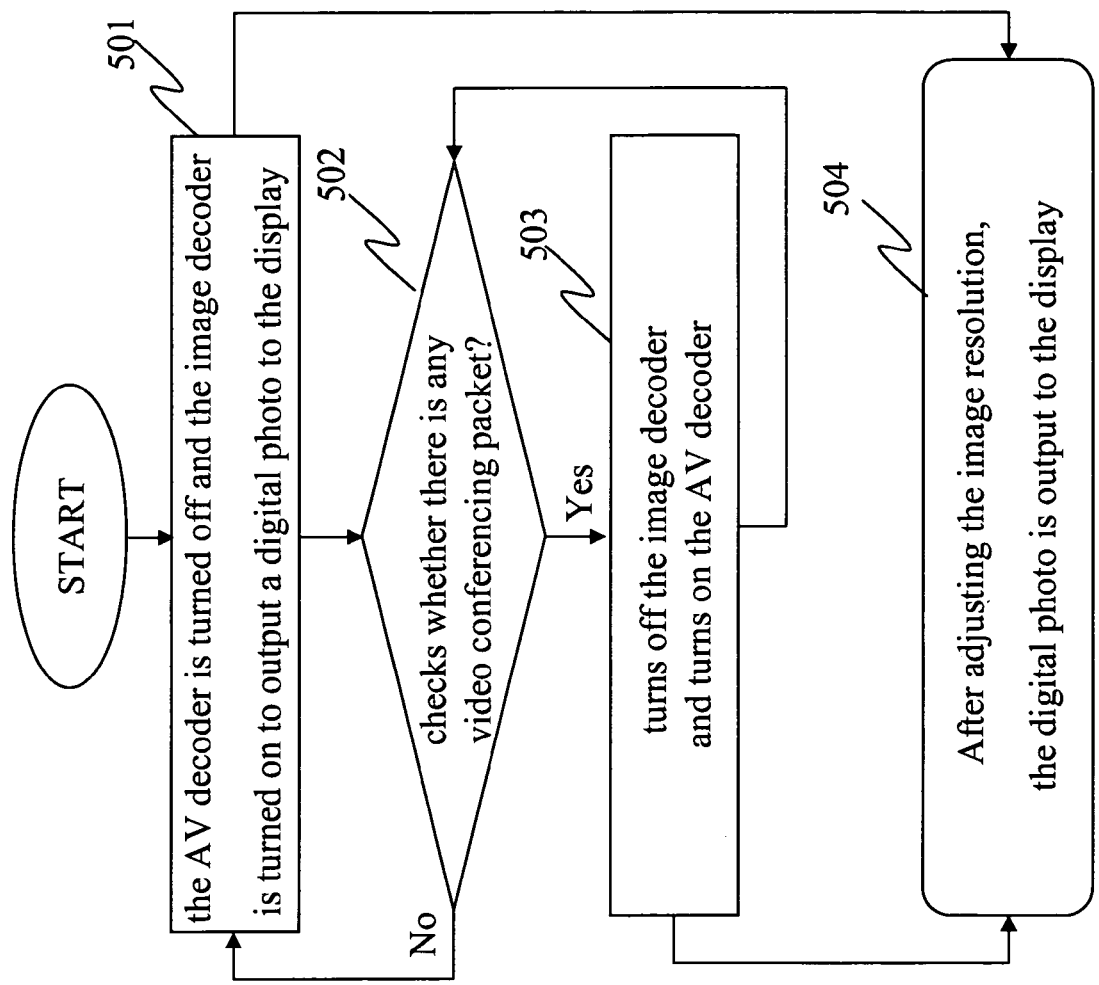
FIG. 2 is a flowchart showing how the display image is switched to the function of a digital frame when the disclosed web video conferencing device is idle.

With reference to FIG. 2, when the disclosed web video conferencing device is idle, the display screen is switched to the function of a digital frame. If there is no incoming signal, the AV decoder 210 is turned off and the image decoder 220 is turned on to output a digital photo to the display 110 in step 501. Step 502 checks whether there is any video conferencing packet. If any video conferencing packet enters the AV decoder 210, step 503 turns off the image decoder 220 and turns on the AV decoder 210. After adjusting the image resolution in step 504, video conferencing images are output to the display 110. Once no video conferencing packet enters the web video conferencing device, the procedure goes back to step 502 to restart the image decoder and shut down the AV decoder 210. After adjusting the image resolution in step 504, the digital photo is output to the display 110.

When the disclosed web video conferencing device is idle, the display screen is switched to the function of a digital frame. The invention has at least the following advantages:

It directly uses the display of a web video conferencing device as the digital frame for displaying a digital photo without the companion of any host other than the web video conferencing device.

The signal processing is completely digitized. It effectively avoids signal distortion, attenuation, or interference.

It solves the problem of no image output when the web video conferencing device is idle. The function of a digital frame is enabled instead.

Certain variations would be apparent to those skilled in the art, which variations are considered within the spirit and scope of the claimed invention.

What is claimed is:

1. A communication system for displaying a digital photo using a web video conferencing device when the web video conferencing device is idle, the communication system comprising:
   a display, configured to display video conferencing images when the web video conferencing device is in use, and to display the digital photo when the web video conferencing device is idle;
   a medium processing device, including:
      an audio/video (AV) decoder, coupled to the display, the AV decoder decoding video conferencing packets into the video conferencing images, and outputting the video conferencing images to the display; and
      an image decoder, coupled to the display, the image decoder decoding a compressed image file into the digital photo, and outputting the digital photo to the display, wherein a spatial resolution of the digital photo is higher than that of the video conferencing images; and
   a switch control device, which is coupled to the AV decoder and the image decoder;
   wherein when no video conferencing packet is input to the AV decoder, the switch control device sends out an interrupt signal to the AV decoder to stop its operation, and sends out a start signal to the image decoder for it to start outputting the digital photo to the display.

2. The communication system of claim 1, wherein the web video conferencing device satisfies a VoIP communication system protocol.

3. The communication system of claim 2, wherein the VoIP communication system protocol satisfies the H.323, media gateway control protocol (MGCP), and session initiation protocol (SIP) standards.

4. The communication system of claim 1, wherein the display is selected from the group consisting of a liquid crystal display (LCD), an organic light-emitting diode (OLED), and a field emission display (FED).

5. The communication system of claim 1, wherein the AV decoder satisfies the G.726 and G.723.1 audio coding standard.

6. The communication system of claim 1, wherein the AV decoder satisfies the H.261 and H.263 video coding standard.

7. The communication system of claim 1, wherein the image decoder satisfies the joint photographic experts group (JPEG) standard.

8. The communication system of claim 1, wherein a display control is coupled among the AV decoder, the image decoder and the display in the medium processing device.

9. The communication system of claim 1, wherein the image decoder is coupled to a storage device.

10. The communication system of claim 9, wherein the storage device is selected from a group consisting of an extended memory module and a hard disk drive.

11. The communication system of claim 9, wherein the storage device for digital photo access is selected from the group consisting a universal serial bus (USB) interface, a Bluetooth wireless device, a memory card, and a networking device.

* * * * *